United States Patent Office 3,173,973
Patented Mar. 16, 1965

3,173,973
GRAPHITE DISPERSION
Marion Clifford Brockway, Columbus, Ohio, assignor to the United States of America as represented by the United States Atomic Energy Commission
No Drawing. Filed Dec. 6, 1962, Ser. No. 243,218
2 Claims. (Cl. 264—21)

The invention relates to a novel method of making a uniform dispersion of nuclear reactor fuel particles within a graphite matrix, particularly of ceramic-coated oxides of the actinide elements.

For reasons of nuclear reactor design it is desirable that dispersions of fuel or blanket particles within a matrix be uniform; otherwise irregularities in the neutron flux will seriously affect the operation of the reactor. Graphite has many points in its favor as a matrix material including its moderator properties, but it reacts with the oxides of the actinide elements such as $UO_2$ and $PuO_2$.

It is known to coat oxide fuel particles with ceramic oxides such as alumina, beryllia, chromia and the like; for example, see the publications of Battelle Memorial Institute known as BMI-1534 (Del.), pages L-1 to L-3, and BMI-1546 (Del.), pages L-5 to L-6. Ceramic coatings of this type protect oxide fuel particles from the action of graphite, but it has been found to be difficult to make uniform dispersions within graphite of the resulting oxide-coated materials with the physical strength needed for reactor use.

It is, accordingly, the general object of the invention to provide a method of making a dispersion within a graphite matrix of nuclear reactor fuel or blanket particles coated with ceramic oxides, so as to be uniform and with mechanical strength necessary for service in a nuclear reactor.

Other objects will appear as the description proceeds.

According to the invention, nuclear fuel particles with ceramic oxide coatings are tumbled in a rotating drum and sprayed while tumbling with two different sprays, one a slurry spray of graphite, binder and solvent, and the other of solvent alone, according to an intermittent, overlapping spraying schedule which produces graphite-coated particles of uniform size and spherical shape. These may then be made into a dispersion of uniform distribution and density by uniaxial forming pressure and then pressure-baking them together.

An even more uniform dispersion may be made by giving the particles a preliminary isostatic pressing within a pressing medium before coating is completed to solidify the particles individually; this is preferably carried out at about twice the uniaxial forming pressure and about four times the pressure of the pressure baking. They are then removed from the pressing medium and when they are later subjected to the lesser pressures of the uniaxial forming pressure and pressure-baking steps, they will be deformed only superficially and their center-to-center distances will not be seriously affected.

In carrying out the invention the oxide ceramic-coated particles, or spheres, are tumbled in a rotating drum with an open end. The oxide-coated particles are preferably from about 180 to about 230 microns in diameter, consisting of a spherical core of $UO_2$ of about 100 to about 150 microns in diameter, uniformly coated by about 40 microns of $Al_2O_3$ by vapor deposition. The particles are preferably tumbled at a linear drum speed of 120 feet per minute.

While tumbling within the drum the particles are sprayed intermittently with two sprays propelled by compressed air, one a slurry of graphite in a solution of organic binder and organic solvent for the binder, and the other a spray of solvent alone. The solvent spray is of longer duration and preferably overlaps the slurry spray at both ends; preferably the solvent spray should be for about seven seconds and the slurry spray, or as it is also called, the slip spray, for about three seconds in the middle of the solvent spray, that is, with two seconds of solvent spray before and after. Eight seconds of drying time, or tumbling without either spray, should preferably come between the injections of solvent spray.

For the solvent, or liquid suspending agent, benzene, toluene, xylene, mixtures thereof or any other organic solvent with similar properties may be used; our preferred solvent is benzene. Any organic binder may be used which leaves a carbon residue on pyrolysis, and which is not incompatible with the solvent or with graphite; our preferred binder is coal-tar pitch. Any form of graphite may be used; our preferred graphite is synthetic graphite powder having an average particle size of approximately 6 microns in diameter. Our preferred proportions for the slip spray are about 0.16 g. of graphite and 0.018 g. of binder per cm.³ of benzene. Tumbling and intermittent spraying should be continued until the desired proportions between fuel and graphite matrix are attained, which will vary according to the design of the reactor in which the fuel is to be used. For a typical reactor the fuel loading of $UO_2$ is around 10 weight percent (w/o).

The resulting graphite-coated spheres may then be warm molded in a die, preferably of steel, at a uniaxial pressure of about 20,000 p.s.i. at about 80±5° C. to form the dispersion shapes desired, such as right cylindrical specimens. These specimens may then be pressure-baked at about 5,000 p.s.i. up to a maximum temperature of about 1250° C. to form a dispersion.

To make an even more uniform dispersion, however, the spheres, before coating with graphite is complete, are taken from the rotating drum and mixed with a substantially larger amount of a pressing medium such as coke powder, powdered rubber and the like, coke powder being preferred. The mixture is then isostatically pressed at about 40,000 p.s.i. by placing it inside a flexible container such as one of film rubber, which is then placed in a liquid such as water under pressure. The pellets, or spheres, and the pressing medium are then separated as by screening, and the spheres are returned to the drum and their coating is completed. They are then warm molded, preferably at about 80±5°, at about 20,000 p.s.i. in the desired dispersion shapes, such as right cylindrical specimens. These specimens are pressure baked at about 5,000 p.s.i. and at up to the same maximum temperature previously mentioned, of about 1250° C.

EXAMPLE I

Ceramic-coated $UO_2$ spheres 180–230 microns in diameter, consisting of $UO_2$ cores coated with 40 microns of vapor deposited $Al_2O_3$ were tumbled in a rotating pelletizing drum. The drum was about 3 inches long, 16 inches in diameter, closed on one end and having an opening 7½ inches in diameter on the opposite end. The drum was rotated at a linear speed of 120 feet/minute.

While the drum continuously rotated and thereby tumbled the spheres, two sprays, propelled by compressed air, were directed at the spheres through the open end. The first, or solvent spray, was of substantially pure benzene; the second, the slurry or slip spray, was of benzene-binder solution in which graphite was suspended. The graphite was synthetic graphite powder having an average particle size of approximately 6 microns in diameter, and the binder was medium-hard coal tar pitch. The proportions of the suspension were 0.16 g. of graphite and 0.018 g. of binder per cm.³ of benzene.

The schedule of spraying was as follows: 7 seconds of solvent spray; three seconds of slip spray beginning after two seconds of the solvent spray and ending two seconds before the completion of the solvent spray; and 8 seconds of drying time in which there was no spraying and the tumbling continued.

The intermittent spraying and tumbling were continued until the fuel loading of the spheres, now coated with graphite over the $Al_2O_3$, amounted to about 10 weight percent $UO_2$, or about 9 w/o U. The spheres were then removed from the drum, and warm molded in a steel die at $80\pm5°$ C. at 20,000 p.s.i. to form right cylindrical specimens. The resulting specimens were then pressure baked at 5,000 p.s.i. at about 1250° C.

The specimens were then sectioned, polished and examined microscopically, which revealed a uniformity of fuel dispersion not previously possible by other methods of dispersion. The specimens were then subjected to neutron irradiation and then monitored for radioactive xenon release. They were also subjected to tensile strength tests with the grain and crushing strength tests against the grain. The results of the various tests are set forth in Table 1 below:

*Table 1.—Property data of cylinders formed from pelletized fuel*

| | |
|---|---|
| Fuel loading: | |
| $UO_2$, w/o | 10 |
| Coated fuel, volume percent | 12.5 |
| Density, g. per cm.$^3$: | |
| Composite | 2.19 |
| Matrix (calculated) | 1.79 |
| Strength, p.s.i.: | |
| Tensile (WG)[a] | 2,200 |
| Crushing (AG) | 13,500 |
| $Xe^{133}$ release ratio [b] | $0.07 \times 10^{-6}$ |

[a] WG and AG refer to orientations with the grain and against the grain, respectively.
[b] The fraction of Xe released by specimens heated to 1150° C. for 1 hr. following neutron activation. For comparison the *same fuel not dispersed in graphite* gave $0.17 \times 10^{-6}$ Xe release when heated to 1320° C. thus indicating the same magnitude of release for both dispersed and undispersed fuel, and indicating that the fuel particle coatings were not damaged in dispersion in the graphite.

EXAMPLE II

The starting material in this example were spheres of $UO_2$ 100–150 microns in diameter having concentric coatings of 14 microns of pyrolytic carbon and 29 microns of dense $Al_2O_3$ as the outer coating. The same procedure as that in Example I was followed except that when the pelletizing with graphite reached the stage where the spheres had a $UO_2$ content of approximately 13 weight percent, the pelletizing was stopped by discontinuing the tumbling and spraying and the spheres were taken from the drum. The spheres were then mixed with a preponderant amount of coke powder and the resulting mixture was fluid-tightly encased in a thin rubber film. This was placed in water inside a press and the water was put under a pressure of 40,000 p.s.i., thereby isostatically pressing the individual spheres. The pressure was discontinued, the mixture removed from the film and the spheres were separated from the coke powder by screening. The spheres were returned to the drum and the spraying and tumbling were resumed in the same manner until a fuel loading of 8 weight percent U was reached. This is equivalent to a $UO_2$ content of about 9 w/o.

The spheres were then removed from the drum a second time, and warm molded into cylindrical specimens at $80\pm5°$ C. and 20,000 p.s.i. The specimens were then pressure baked at 5,000 p.s.i. at about 1250° C.

The specimens were then sectioned and subjected to the same tests as in Example I. Microscopic examination revealed an even more uniform fuel distribution than that of the specimens in Example I. Graphite matrix orientation was observed under polarized light and it was found that the graphite crystallites were preferentially oriented parallel to the surface of the dispersed fuel particles. Such orientation is believed to provide directionally isotropic matrix properties in the volumes immediately surrounding each dispersed fuel particle, thereby enhancing mechanical strength and retention of fission product gases.

Table II gives the data resulting from the tests on the materials produced in this example:

*Table 2.—Property data of cylinders formed from pelletized-isostatically compacted-pelletized fuel*

| | |
|---|---|
| Fuel loading: | |
| $UO_2$, weight percent | 8.0 |
| Coated fuel, volume percent | 7.7 |
| Density, g. per cm.$^3$: | |
| Composite | 2.08 |
| Matrix (calculated) | 1.82 |
| Strength, p.s.i.: | |
| Tensile (WG)[a] | 2,280 |
| Crushing (AG) | 12,500 |
| $Xe^{133}$ release ratio [b] | $0.09 \times 10^{-6}$ |

[a] WG and AG refer to orientations with the grain and against the grain relative to orientations which would normally be produced in molding. As noted above the matrix orientation of the specimens was more complex.
[b] Fraction of Xe released by specimens heated to 1150° C. for 1 hr. following neutron activation. For comparison, the same fuel not dispersed in graphite gave $0.11 \times 10^{-6}$ Xe release when heated to 1320° C. following neutron activation.

It will be understood that this invention is not to be limited to the details given herein, but that it may be modified within the scope of the appended claims.

What is claimed is:

1. A method of making a dispersion of oxide-coated particles within a matrix essentially of graphite, comprising tumbling them in a rotating drum, simultaneously with the tumbling spraying them intermittently with a spray of solvent and a spray of a slurry of graphite in a solution of organic binder and organic liquid solvent, until the particles are coated with a major portion of the graphite matrix material, removing them from the drum, pressing them isostatically within a pressing medium, separating them from the pressing medium, tumbling them and spraying them a second time intermittently with a spray of solvent and a spray of a slurry of graphite in a solution of organic binder and organic liquid solvent until coating is complete, removing them from the drum, pressing them uniaxially into the shape of the dispersion, and pressure baking the shape.

2. A method of making a uniform dispersion of oxide ceramic-coated nuclear reactor spheres within a matrix essentially of graphite, comprising tumbling the spheres within a rotating drum and simultaneously with the tumbling spraying them during each fifteen seconds for seven seconds with a spray of benzene and, during the middle three seconds of the seven seconds, with a spray of a slurry of graphite in a solution of medium coal-tar pitch in benzene, removing the resulting graphite-coated spheres from the drum, drying the spheres, uniaxially pressing the coated spheres into the shape of the dispersion at about 20,000 p.s.i. and $80\pm5°$ C., and baking them under uniaxial pressure of about 5,000 p.s.i. and about 1250° C.

References Cited by the Examiner

UNITED STATES PATENTS

| | | | |
|---|---|---|---|
| 1,838,287 | 12/31 | Schreurs | 117—109 |
| 2,965,931 | 12/60 | Alden et al. | 18—47.5 |
| 2,967,812 | 1/61 | Thurber | 204—154.2 |
| 2,990,351 | 6/61 | Sanz et al. | 204—154.2 |
| 3,021,566 | 2/62 | Sommer | 18—47.5 |
| 3,031,389 | 4/62 | Goeddel et al. | 264—21 |
| 3,035,003 | 5/62 | Kessler | 117—109 |

BENJAMIN R. PADGETT, *Primary Examiner.*

REUBEN EPSTEIN, CARL D. QUARFORTH, L. DEWAYNE RUTLEDGE, *Examiners.*